United States Patent [19]

Hart et al.

[11] 3,788,166

[45] Jan. 29, 1974

[54] SPEED RESPONSIVE LOCKING DIFFERENTIAL

[75] Inventors: Cullen P. Hart; Paul C. Rosenberger, both of Decatur, Ill.

[73] Assignee: Caterpillar Tractor Co., Peoria, Ill.

[22] Filed: Apr. 28, 1972

[21] Appl. No.: 248,574

[52] U.S. Cl. .............................................. 74/710.5
[51] Int. Cl. ............................................. F16h 1/44
[58] Field of Search .................... 74/710.5; 192/4 A

[56] References Cited
UNITED STATES PATENTS
| | | | |
|---|---|---|---|
| 3,368,638 | 2/1968 | Terry et al. | 74/710.5 X |
| 3,642,103 | 2/1972 | Schott | 74/710.5 X |
| 2,314,664 | 3/1943 | Shonstone | 74/710 X |
| 2,894,416 | 7/1959 | Scott | 74/710.5 |

*Primary Examiner*—Arthur T. McKeon
*Attorney, Agent, or Firm*—Fryer, Tjensvold, Phillips & Lempio

[57] ABSTRACT

A locking differential assembly for vehicles including a hydraulically operated disc clutch for locking the differential assembly and a control system for the clutch associated with a transmission having speed range selection means, the control system normally permitting differential operation in high operating speed ranges of the transmission while actuating the clutch to normally prevent differential operation in low operating speed ranges, the control system also including a manually operable override control to selectively establish differential operation in low speed range settings of the transmission.

1 Claim, 2 Drawing Figures

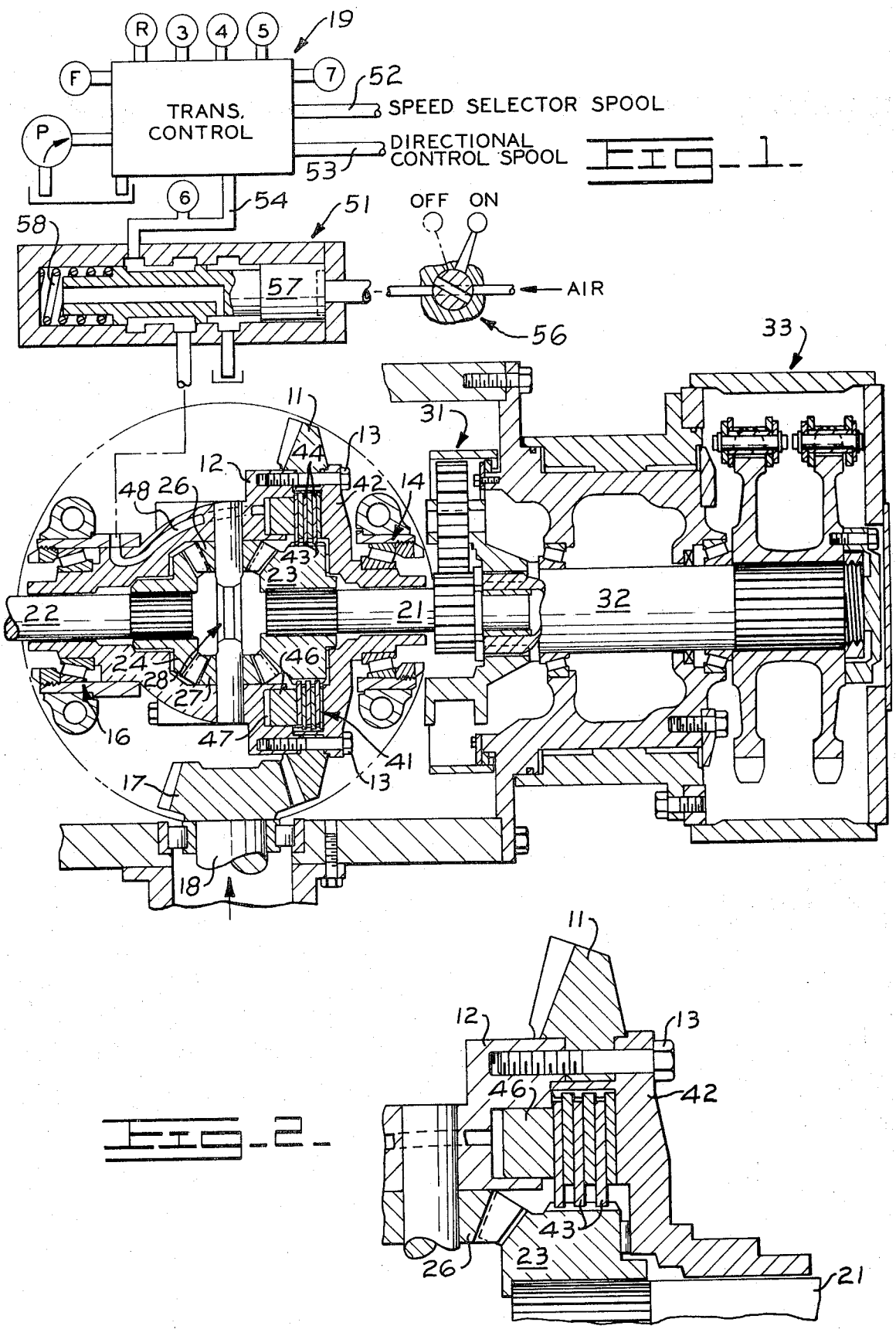

SPEED RESPONSIVE LOCKING DIFFERENTIAL

BACKGROUND OF THE INVENTION

The present invention relates to a locking differential assembly and more particularly to such a differential assembly of the type used for example in heavy duty machinery such as earthmoving vehicles. In such equipment, it has been found that differential operation of the assembly is often undesirable under low speed, high load conditions since operating life of the differential assembly and more particularly the pinion bearings therein may be substantially decreased.

It has further been found desirable to adapt the differential assembly itself for increased resistance to wear from heavy loads during operation. It has also been found desirable to adapt the locking means so that the locking function may be accomplished regardless of the instant operating condition for the differential assembly. For example, it may be desirable to permit actuation of the locking means even while a load is being driven through the differential assembly and under differential operation of the assembly.

SUMMARY OF THE INVENTION

To overcome one or more of the problems set forth above, the present invention contemplates a locking differential wherein the locking function is accomplished by a hydraulically actuated disc clutch arranged within a differential assembly, a control system for the clutch being associated with a transmission for accomplishing speed range selection and normally preventing differential operation in low operating speed ranges of the transmission, manually operable override control means being effective to selectively establish differential operation even in low speed range setting of the transmission.

Within such a combination, the hydraulically actuated disc clutch tends to permit locking or unlocking of the differential assembly during substantially all operating conditions. The control system normally prevents differential operation in low speed range settings particularly when high load conditions may exist. The manual override permits an operator to selectively maintain differential operation even for low speed range settings, this function being desirable for example when the vehicle is being manuevered under relatively minimum load conditions.

Other objects and advantages of the present invention are made apparent in the following description having reference to the accompanying drawings.

BRIEF DESCRIPTION OF THE DRAWINGS

FIG. 1 is a partially sectioned view of a differential assembly for a vehicle including locking means and a control system for regulating the locking means in accordance with the present invention; and FIG. 2 is an enlarged, fragmentary view of the locking means within the differential assembly.

DETAILED DESCRIPTION OF THE PREFERRED EMBODIMENT

A locking differential assembly of the type illustrated in FIG. 1 includes a ring gear 11 and a differential gear carrier 12 secured together by a plurality of bolts such as those indicated at 13. The ring gear and carrier member are rotatably journaled within a housing (not shown) by means of bearings 14 and 16. The ring gear 11 is driven by a bevel gear 17 which is connected by a shaft 18 to a vehicle transmission which is not shown but is of the type adapted for operation by a control assembly as generally indicated at 19. A pair of output shafts 21 and 22 extend into the differential assembly and are respectively splined to a pair of output gears 23 and 24. The roller-bearing supported differential pinions 26 and 27 are journaled on a spider 28 which is secured within the carrier 12 to conventially provide differential action within the assembly. During differential drive, the carrier member 12 and the ring gear 11 rotate relative to both of the output shafts 21 and 22.

Each of the output shafts is coupled through a planetary final drive arrangement with a respective axle for supporting and driving a driven ground wheel for the vehicle. For example, a planetary final drive assembly 31, an axle 32 and a wheel 33 are shown in coupled relation with the output shaft 21. A similar arrangement for the output shaft 22 is not shown merely to permit greater detail within the differential assembly.

Locking means for the differential assembly, referring to FIG. 2 as well as FIG. 1, includes a hydraulically actuated disc clutch 41 which may be engaged to prevent relative rotation of the ring gear 11 and carrier 12 with the output gear 23, thus preventing differential operation of the output shafts 21 and 22. As may be better seen in FIG. 2, and end cover plate 42 is also secured to the ring gear 11 and carrier 12 by the bolts 13. The clutch 41 includes a plurality of clutch discs 43 and plates 44 which are interleaved and respectively coupled with the output gear 23 and the ring gear 11. An actuating piston 46 is slidably arranged within an actuating chamber 47 formed by the carrir member 12 and arranged for interaction with the clutch discs 43 and plates 44 to control actuation or engagement of the disc clutch 41. Actuating fluid is introduced into the chamber 47 through a passage 48 also formed in the carrier member 12. Upon pressurization of the chamber 47, the piston 46 is urged rightwardly as shown in the drawing to actuate the clutch 41.

A control system for delivering actuating fluid to the chamber 47 through the passage 48 includes a valve assembly 51 providing communication for the passage 48 with the transmission control assembly 19. As is generally indicated at FIG. 1, the transmission control assembly includes a speed rage selector spool 52 and a directional control spool 53. Fluid under pressure is delivered to the transmission control from a pump indicated at P. The transmission operated by the transmission control assembly 19 includes forward and reverse gears respectively operated by hydraulic clutches indicated at F and R. The clutch indicated at 6 establishes a low speed range for the transmission while the clutch indicated at 7 establishes a high speed range for the transmission. The clutches 3, 4 and 5 operate in conjunction with either of the clutches 6 and 7 to establish the instant operating speed range for the transmission.

A single conduit 54 communicates the transmission control assembly 19 with both the clutch 6 and the valve 51. Thus, as the transmission control assembly 19 is conditioned by the speed selector spool 52 for low speed operation, actuating fluid communicated from the pump P to the clutch 6 is also communicated to the valve 51 and thus to the passage 48 and actuating chamber 47. The disc clutch 41 is accordingly engaged during pressurization of the clutch 6 at least when the valve 51 is in the position shown.

A manual control 56 is associated with the valve 51. The manual control 56 is shown in an OFF condition which positions a spool 57 in the valve 51 to provide communication between the conduit 54 and the passage 48. The manual control 56 also has an ON position which shifts the spool 57 leftwardly to block the conduit 54 from the passage 48 so that the clutch 41 is not actuated or engaged when the clutch 6 is pressurized. To accomplish this purpose, the manual control 56 may simply communicate air pressure against the right end of the spool 57 to bias it leftwardly against a spring 58 to selectively close communication between the conduit 54 and the passage 48.

Thus, the locking differential and control system of the present invention function automatically to provide differential action in high speed ranges while normally preventing differential action in low speed ranges. However, a manual override control provides an option whereby an operator may selectively maintain differential action even in low speed ranges.

We claim:

1. A drive mechanism for a vehicle comprising a differential hving a driving input gear, a driven ring gear, wheel driving shafts, gears secured to said shafts and driven from the ring gear, a disc clutch disposed between the ring gear and one of said shafts, a change speed transmission having separate low speed and high speed clutches, a source of fluid under pressure, means controlling said transmission and selectively communicating said fluid with said clutches and said disc clutch, valve means disposed between said transmission controlling means and said disc clutch automatically responsive to the actuation of said low clutch means only to communicate fluid to said disc clutch to actuate the same to prevent differential action, a manual override means connected to the valve means being operable to condition the valve means for blocking communication between said low clutch means, the source of fluid and the disc clutch.

* * * * *